June 6, 1939. E. K. ANDERSON 2,161,270
BELT PULLEY
Filed Sept. 21, 1938 2 Sheets-Sheet 1
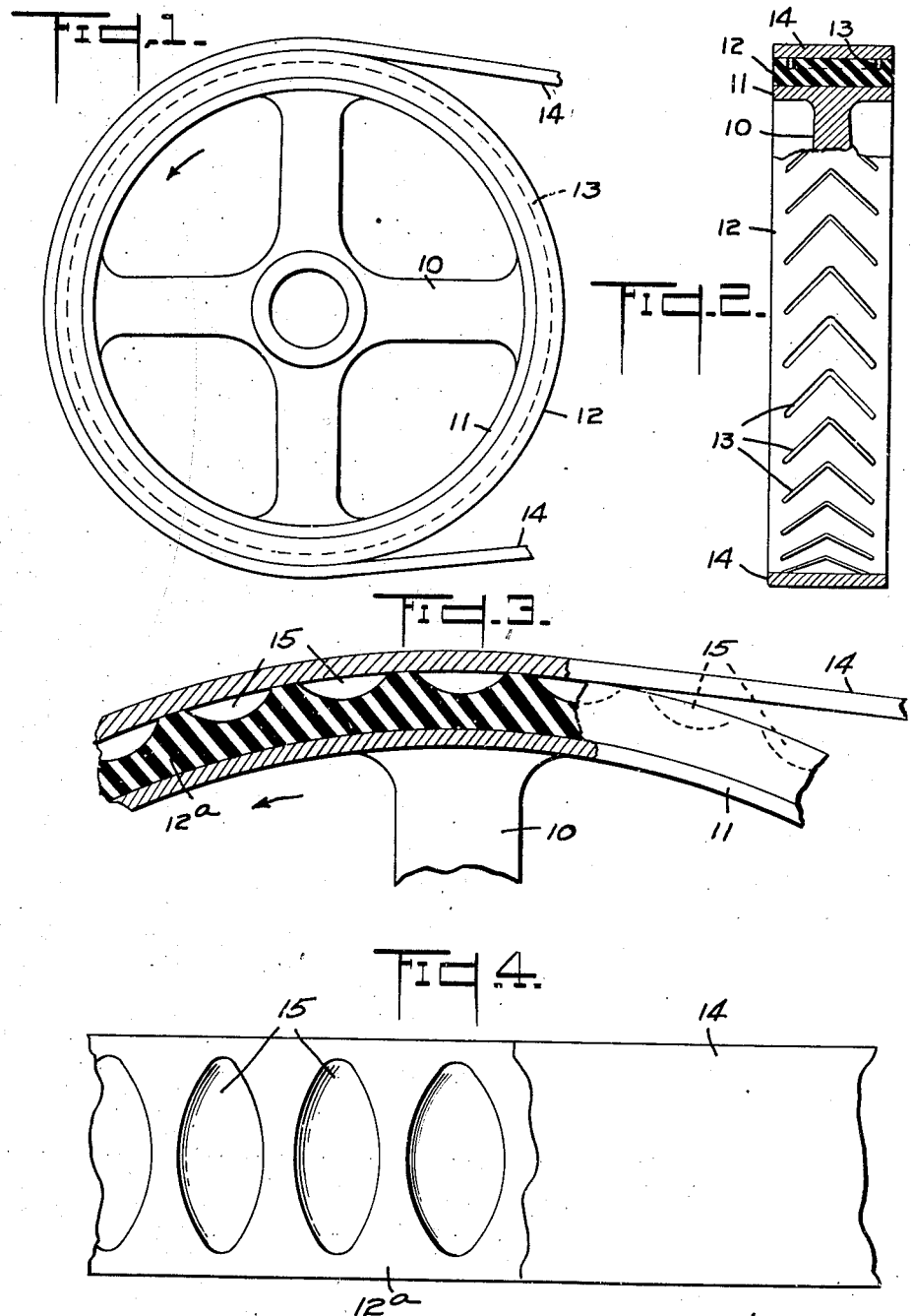
Erich Kraus Anderson
INVENTOR
BY
his ATTORNEY

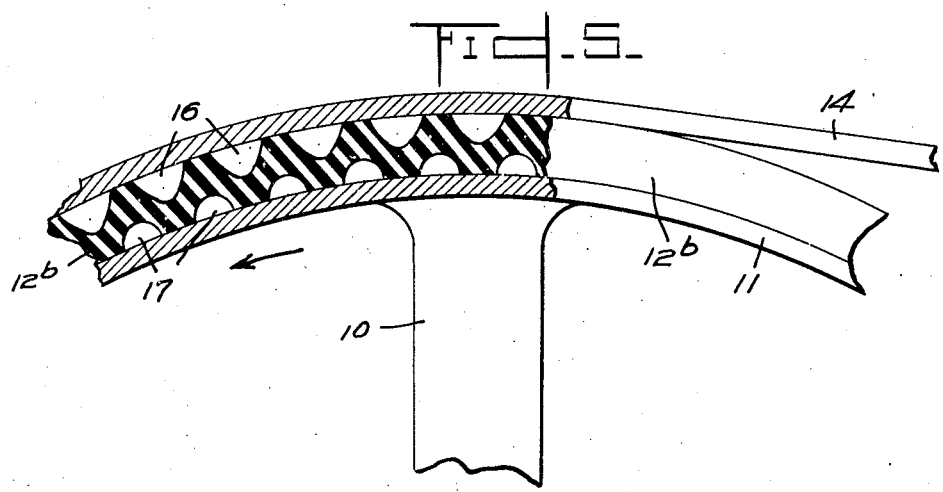
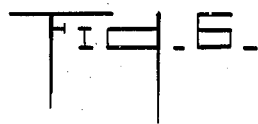
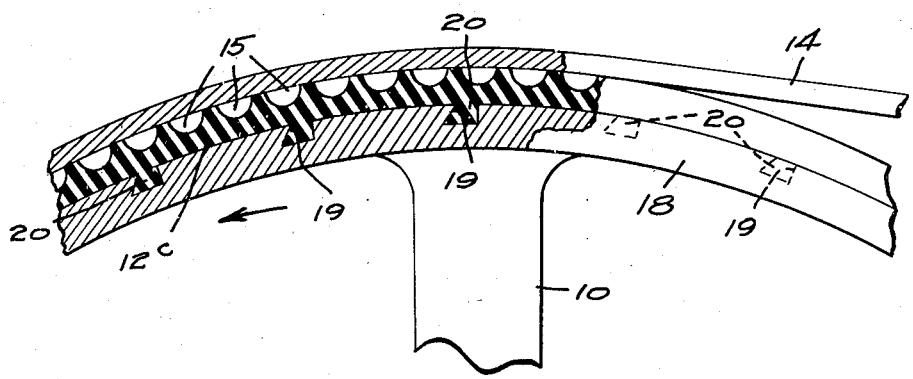
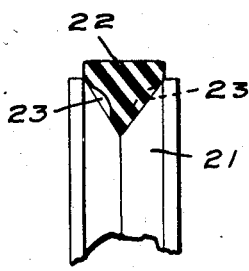

Patented June 6, 1939

2,161,270

UNITED STATES PATENT OFFICE 2,161,270

BELT PULLEY

Erich Kraus Anderson, Trenton, N. J.

Application September 21, 1938, Serial No. 230,914

1 Claim. (Cl. 74—230.7)

This invention relates to improvements in the construction and operation of a belt and its pulleys to transmit power from one point to another in a mechanical apparatus.

A belt is a flexible connector which passes over a smooth-faced pulley wheel either flat or V-shaped and whose surface it grips by friction alone. The belt does not provide a drive of the same degree of positiveness as a chain and sprocket since the belt may at times slip on the pulley wheel. This characteristic is often an advantage in favor of the belt, but more often it is the reason for the use of a more positive drive although the belt might actually be a better power transmission medium if it were not for the inherent slippage between it and its pulleys.

It has been found of particularly practical value in power transmission to provide a pulley wheel and belt connector of a construction which actually retains all of the desirable features of the flexible belt and smooth face pulley wheel as well as the advantages associated with a more positive drive connection, e. g., chain and sprockets.

Therefore, it is the principal object of my invention to provide a pulley wheel or its belt or both with a friction surface having a plurality of suction spaces disposed in one of the contacting surfaces which in operation will have a tendency to grip the opposed surface and prevent all possible slippage between belt and pulley within certain limits of tension equal, for example, to the breaking point of the belt.

Another object of this invention is to provide the peripheral surface of a pulley wheel with a resilient ring having disposed in its outer surface a plurality of depressions or cup-shaped grooves for the purpose of creating a suction grip upon the contacting surface of the belt passing over the ring.

Another object of the present invention is to provide opposite faces of a resilient ring with vacuum spaces to cause the ring to adhere closely to the surface of the pulley wheel to which it is applied and to create a suction grip upon the belt passing thereover.

A still further object of my invention is to provide a flexible belt of V-shaped transverse cross-section with vacuum spaces disposed along its converging side walls to cause the belt to grip the sides of the V-shaped groove in the pulleys carrying the belt.

I accomplish these objects by means of the various embodiments of my invention hereinafter described in the specification, set forth in the appended claim, and illustratively exemplified in the accompanying drawings, in which Fig. 1 is an elevational view of a pulley wheel with resilient ring;

Fig. 2 is a front elevational view of a pulley wheel showing the peripheral surface construction of the resilient ring and a portion of the wheel and rim in cross-section;

Fig. 3 is a substantially transverse sectional view of a portion of the pulley wheel and resilient ring;

Fig. 4 is a plan view of the resilient ring showing the surface construction;

Fig. 5 is a sectional view of the pulley wheel and resilient ring having suction spaces on opposite faces thereof;

Fig. 6 is a sectional view of a modified rim connection between the pulley wheel and resilient ring;

Fig. 7 is a substantially longitudinal sectional view of a V-shaped pulley wheel rim and V-shaped belt.

Referring to the drawings and particularly to Figures 1 and 2, 10 denotes a pulley wheel having the usual smooth surfaced rim 11. Mounted upon the rim 11 is a traction ring 12 made of rubber or any other suitable resilient composite material. The ring 12 before being applied to the rim 11 is substantially smaller than the periphery of the rim so that it is necessary to expand the ring and place it upon the rim where it remains under tension to insure very close adhesion to the pulley wheel.

The resilient ring 12 on its outer peripheral surface is provided with a plurality of grooves 13, which may be of any shape or design but which are limited in length so as not to project to the edges of the ring. In Fig. 2, I have shown the grooves 13 of V-shape one following another and having its arms projecting to points short of the side edges of the ring. The belt 14 is shown embracing the grooved surface of the ring 12 and extending beyond the opposite ends of the grooves 13.

In operation the stretch of the belt passing over the pulley from the loose to the tight side causes a tension in the belt and a friction force is developed which tends to squeeze the traction ring 12 and which forces the air from the grooves 13. This condition upon flexing of the materials creates a vacuum seal or grip between belt and ring and consequently prevents creeping of the belt with respect to the pulley wheel.

This type of pulley with its resilient vacuum cupped surface eliminates the use of specially traction threaded belts and makes possible a more accurate control of belt driven machinery. In practice the present belt drive has been found to be comparable with a chain drive giving instantaneous pick up and stop which are particularly important safety features on all types of coasting equipment drives as well as on machine tools and lathes. No belt dressing as a traction dope is necessary with my new belt drive, which means a greater working life for the belt, in fact the present invention in use prolongs not only the life of the belt because of the uniform load distribution on the pulley surface, but likewise reduces the wear of the pulley shaft bearings as against the variable loads encountered with straight belt and pulley drives brought about by slippage between belt and pulley.

Referring now to a further embodiment of my invention illustratively exemplified in Figures 3 and 4, the pulley wheel 10 is provided with a traction ring 12a adhering to the rim 11, the ring 12a having its outer peripheral traction surface provided with successive oblong or oval-shaped depressions 15, each of which under slight compression of the ring sets up a vacuum grip upon the under surface of the belt 14. It is important to note that as in the other embodiments the depressions do not extend at either end to the edge of the ring and the width of the belt is such as to insure complete coverage for the depressions.

In Fig. 5, the belt 14 is carried upon a resilient ring 12b having grooves 16 in its outer surface and grooves 17 in its inner surface, the latter grooves setting up vacuum grips along the surface of the rim 11 to hold the ring against slipping upon the rim.

Figure 6 illustrates a further means of attaching the ring 12c to a rim 18, which is provided with key slots 19 in its surface, the side wall of each slot being inclined away from its other side wall in the direction of movement of the pulley. The inner periphery of the resilient ring 12c is provided with lugs 20 which fit into the slots 19 and bring about a lock between rim and ring capable of absorbing the heavy shock loads of large machinery in operation.

The present invention applied to V-belt drives is illustrated in Figure 7 in which 21 denotes the V-shape pulley rim and 22 the V-shape belt. The sides of the V-shape belt 22 are provided with vacuum cups or depressions 23 which under tension in the groove of the pulley tend to grip the latter and prevent slippage.

Having described the various embodiments of my invention and the manner in which the same operates, what I claim and desire to secure by Letters Patent is:

In combination, a pulley wheel having a smooth surface therein, a resilient ring disposed peripherally of the wheel and provided in its outer surface with a series of depressions projecting to points short of the opposed sides of the ring and with further depressions in its inner surface, and a belt passing over said pulley in contact with the surface of the ring and completely covering the depressions in the outer surface thereof, whereby the ring is compressed under the belt and the air is exhausted from both groups of depressions to set up a vacuum grip between the pulley and the ring on the one hand and the ring and belt on the other hand.

ERICH KRAUS ANDERSON.